United States Patent
Yasufuku et al.

(10) Patent No.: US 10,252,209 B2
(45) Date of Patent: Apr. 9, 2019

(54) NANOFIBER SHEET AND METHOD OF PRODUCING THE SHEET

(71) Applicant: CANON KABUSHIKI KAISHA, Tokyo (JP)

(72) Inventors: Kaori Yasufuku, Kawasaki (JP); Tetsuo Hino, Yamato (JP); Kenji Takashima, Numazu (JP); Kazuhiro Yamauchi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/090,952

(22) Filed: Apr. 5, 2016

(65) Prior Publication Data

US 2016/0296874 A1 Oct. 13, 2016

(30) Foreign Application Priority Data

Apr. 13, 2015 (JP) .................................. 2015-081875

(51) Int. Cl.
  *B01D 39/16* (2006.01)
  *B01D 46/54* (2006.01)
  *B01D 46/00* (2006.01)

(52) U.S. Cl.
  CPC ......... *B01D 46/546* (2013.01); *B01D 39/163* (2013.01); *B01D 39/1623* (2013.01); *B01D 2239/025* (2013.01)

(58) Field of Classification Search
  CPC .............. B01D 46/546; B01D 39/1623; B01D 39/163; B01D 2239/025
  See application file for complete search history.

(56) References Cited

U.S. PATENT DOCUMENTS

| | | | | |
|---|---|---|---|---|
| 6,330,883 | B1* | 12/2001 | Berger | B01D 39/163 128/201.13 |
| 7,655,070 | B1* | 2/2010 | Dallas | B01D 39/1623 95/154 |
| 8,889,573 | B2 | 11/2014 | Kamisasa | |
| 2005/0235619 | A1* | 10/2005 | Heinz | B01D 39/163 55/486 |
| 2006/0191249 | A1* | 8/2006 | Gogins | B01D 39/1623 55/528 |
| 2012/0328377 | A1* | 12/2012 | Brenneis | C04B 28/021 405/267 |
| 2013/0306562 | A1* | 11/2013 | Stifter | B01D 39/163 210/652 |

FOREIGN PATENT DOCUMENTS

| | | |
|---|---|---|
| JP | 2011-214170 A | 10/2011 |
| JP | 2012-134135 A | 7/2012 |
| WO | 2010/027063 A1 | 3/2010 |

* cited by examiner

*Primary Examiner* — Jason M Greene
(74) *Attorney, Agent, or Firm* — Venable LLP

(57) ABSTRACT

Provided is a nanofiber sheet that has a high mechanical strength, is excellent in durability, and has a high specific surface area. The nanofiber sheet includes: a plurality of nanofibers; and a bulk portion produced by bonding of the nanofibers, in which $7 \times 10^{-3}$ portion/$\mu m^2$ or more of the bulk portion satisfying the following formula is contained:

$$0.5\pi X^2 \leq Y \leq 5 \ \mu m^2 \quad (1)$$

where X represents a diameter ($\mu m$) of each of the nanofibers and Y represents an area ($\mu m^2$) of an inscribed circle of the bulk portion when viewed from a surface.

15 Claims, 6 Drawing Sheets

NANOFIBER SHEET AND METHOD OF PRODUCING THE SHEET

BACKGROUND OF THE INVENTION

Field of the Invention

The present invention relates to a nanofiber sheet and a method of producing the sheet.

Description of the Related Art

In recent years, a nanofiber sheet typified by a polymer nanofiber sheet, the sheet being formed by integrating a plurality of nanofibers each containing a polymer and three-dimensionally entangling the nanofibers with each other, has been attracting attention as a material having a large specific surface area.

The nanofibers of a related-art nanofiber sheet are three-dimensionally entangled with each other, but the entanglement is based on only physical entanglement. Accordingly, the related-art nanofiber sheet has a low mechanical strength and tends to be weak against a tensile force and friction, and hence involves problems in practical use. In view of the foregoing, various approaches have been developed for improving the mechanical strength of the nanofiber sheet. In Japanese Patent Application Laid-Open No. 2011-214170, there is a disclosure of an approach involving performing a partial bonding treatment in which a thread-like nanofiber structural body formed by twisting a plurality of nanofibers is heated to partially bond the nanofibers to each other. According to Japanese Patent Application Laid-Open No. 2011-214170, a nanofiber structural body improved in strength can be obtained by the partial bonding treatment. An approach involving bonding portions where nanofibers are in contact with each other through the application of energy has also been developed. In Japanese Patent Application Laid-Open No. 2012-134135, there is a disclosure of an approach involving thermally fusing extra-fine fibers obtained by dividing a division-type composite fiber formed of an ethylene-vinyl alcohol copolymer and polypropylene, and synthetic short fibers to mold a nonwoven fabric. Further, in International Publication No. WO2010/027063A, there is a disclosure of an approach involving forming extra-fine composite fibers from a composite resin molded product and thermally bonding the extra-fine composite fibers to form a fiber assembly.

However, in the approach of Japanese Patent Application Laid-Open No. 2011-214170, it is difficult to control, for example, a temperature suitable for the performance of the partial bonding treatment for the nanofibers, and hence the bonding of the nanofibers does not progress or the nanofibers largely melt depending on their surrounding environment. When the bonding of the nanofibers does not progress, a strength which the nanofiber structural body is required to have is not obtained. On the other hand, when the nanofibers largely melt, surrounding nanofibers completely integrate with each other, and hence the diameter of the resultant fiber itself becomes several micrometers or more to reduce the specific surface area of the structural body. In addition, in the approach of Japanese Patent Application Laid-Open No. 2012-134135, a temperature condition for the molding of the nonwoven fabric is narrow, specifically ranges from 140° C. to 175° C. Further, the short fibers each having a large diameter are used in the nonwoven fabric to be used, and hence many large pore diameters are present in the nonwoven fabric. Accordingly, the nanofiber structural body obtained by the approach of Japanese Patent Application Laid-Open No. 2012-134135 is not suitable for the collection of a minute substance and hence does not adapt to an application as a filter. Further, in the approach of International Publication No. WO2010/027063A, a melt electrospinning method is adopted, but the extra-fine composite fibers spun by the method each have a large diameter and hence the area of a bulk portion produced when thermal bonding of the extra-fine composite fibers is large. Accordingly, large pore diameters are found here and there in the resultant fiber assembly. Accordingly, it is difficult for the fiber assembly obtained by the approach of International Publication No. WO2010/027063A to prevent the leakage of an extremely fine substance, though the assembly has a high air permeability.

SUMMARY OF THE INVENTION

The present invention provides a nanofiber sheet that has a high mechanical strength, is excellent in durability, and has a high specific surface area.

According to one embodiment of the present invention, there is provided a nanofiber sheet, including:
a plurality of nanofibers; and
a bulk portion produced by bonding of the nanofibers,
in which $7 \times 10^{-3}$ portion/$\mu m^2$ or more of the bulk portion satisfying the following formula (1) is contained:

$$0.5\pi X^2 \leq Y \leq 5 \ \mu m^2 \tag{1}$$

where X represents a diameter ($\mu m$) of each of the nanofibers and Y represents an area ($\mu m^2$) of an inscribed circle of the bulk portion when viewed from a surface.

According to the present invention, the nanofiber sheet that has a high mechanical strength, is excellent in durability, and has a high specific surface area can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A nanofiber sheet of the present invention includes a plurality of nanofibers and a bulk portion produced by the bonding of the nanofibers. In the present invention, $7 \times 10^{-3}$ portion/$\mu m^2$ or more of the bulk portion satisfying the following general formula (1) is contained.

$$0.5\pi X^2 \leq Y \leq 5 \ \mu m^2 \quad (1)$$

Details about the general formula (1) are described later.

The nanofiber sheet of the present invention is hereinafter described with reference to the drawings.

(Nanofiber Sheet)

Figure 1A:
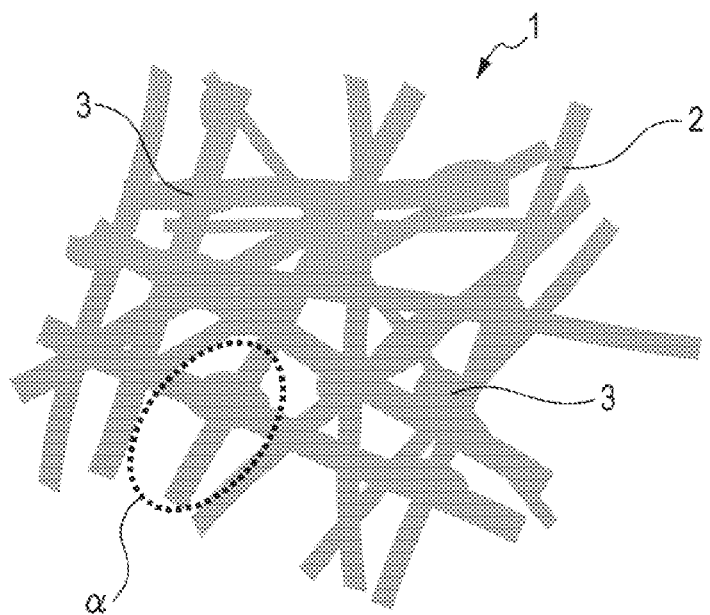
FIG. 1A is a schematic view for illustrating a nanofiber sheet according to an exemplary embodiment of the present invention and FIG. 1B is a partial enlarged view of an a portion in FIG. 1A.
Figure 1B:
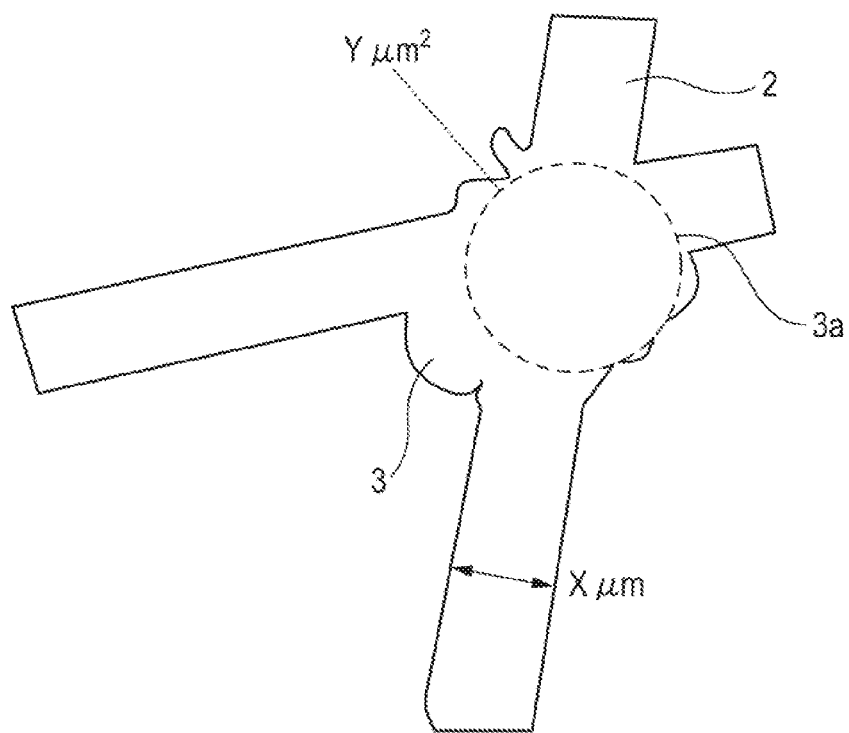

FIG. 1A is a schematic view illustrating a nanofiber sheet according to an exemplary embodiment of the present invention. FIG. 1B is an enlarged sectional view of an a portion in FIG. 1A. A nanofiber sheet 1 of FIG. 1A is a sheet-like structural member in which a plurality of nanofibers 2 are integrated and three-dimensionally entangled with each other. As described above, the nanofiber sheet of the present invention basically includes the nanofibers 2 and hence a moderate space is formed between the plurality of nanofibers 2 entangled with each other. Therefore, the nanofiber sheet of the present invention necessarily has a high specific surface area.

In addition, the nanofiber sheet of the present invention has a bulk portion 3 in addition to the nanofibers 2 as illustrated in FIG. 1B. The bulk portion 3 is a site produced by the bonding of the nanofibers 2, and is formed mainly through the physical association of the plurality of molecules of the nanofiber sheet 1 or a chemical reaction caused by the plurality of molecules of the nanofiber sheet 1. That is, in the nanofiber sheet of the present invention, the physical association or the chemical reaction occurring in, or on the surfaces of, the nanofibers progresses, and each of the nanofibers 2 is bonded to any other nanofiber in a state of forming the bulk portion 3. The physical association and the chemical reaction occurring when bonding of the nanofibers may simultaneously occur.

(1) Bulk Portion

Now, the bulk portion in the nanofiber sheet of the present invention is described in detail. As illustrated in FIG. 1B, the bulk portion 3 is a member whose width is larger than the diameter of each of the nanofibers 2. Herein, an inscribed circle 3a inscribed in the bulk portion 3 illustrated in FIG. 1B is used for defining the size of the bulk portion 3. In the present invention, $7 \times 10^{-3}$ portion/$\mu m^2$ or more of the bulk portion 3 satisfying the following general formula (1) is contained.

$$0.5\pi X^2 \leq Y \leq 5 \ \mu m^2 \quad (1)$$

In the formula (1), X represents the diameter ($\mu m$) of each of the nanofibers 2. The diameter of each of the nanofibers 2 is also referred to as "nanofiber diameter," and is a value obtained by averaging values for diameters obtained by measuring the nanofiber 2 in the nanofiber sheet 1 at a plurality of sites.

Figure 2A:
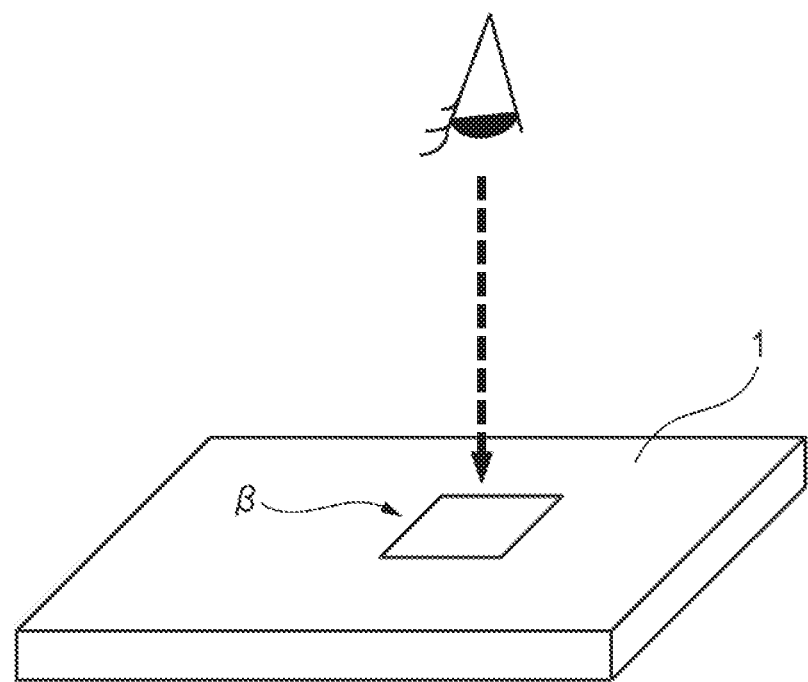
FIG. 2A is a schematic view for illustrating a situation in which the nanofiber sheet of the present invention is observed from directly above and FIG. 2B is a schematic view for illustrating a situation in which a β portion in FIG. 2A is observed.
Figure 2B:
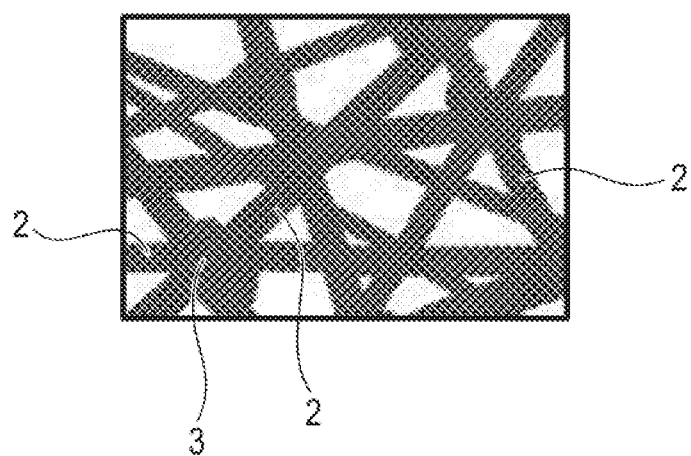

In the formula (1), Y represents the area ($\mu m^2$) of the inscribed circle 3a of the bulk portion 3 when viewed from a surface. The phrase "when viewed from a surface" as used herein means that the nanofiber sheet 1 is observed from directly above as illustrated in FIG. 2A. For example, when a β portion in FIG. 2A is observed and the result of the observation is as illustrated in FIG. 2B, the bulk portion 3 that can be confirmed, for example, because its width is larger than the diameter of each of the nanofibers 2 is evaluated as to whether or not the bulk portion satisfies the general formula (1).

As described above, the nanofiber sheet of the present invention includes the plurality of nanofibers, and some of the nanofibers are bonded to other nanofibers by, for example, the entanglement of the nanofibers. In the nanofiber sheet of the present invention, when the nanofibers are bonded to each other as described above, the shapes of the nanofibers in a portion where the nanofibers are bonded to each other may change as compared to those before the bonding, while the shapes may not change as compared to those before the bonding. When the nanofibers are bonded to each other, a portion where the shapes of the nanofibers change after the bonding as compared to those before the bonding as described above is a portion called the bulk portion 3 illustrated in each of FIG. 1A and FIG. 1B.

In addition, the bulk portions in the nanofiber sheet of the present invention are present not only on the surface of the nanofiber sheet but also in the nanofiber sheet.

A bulk portion whose inscribed circle has an area (Y value) of less than $0.5\pi X^2$ ($\mu m^2$) out of the plurality of bulk portions present in the nanofiber sheet corresponds to an excessively small bulk portion, and does not function as a site for strengthening the nanofiber sheet of the present invention. In contrast, a bulk portion whose inscribed circle has an area of more than 5 $\mu m^2$ corresponds to an excessively large bulk portion. In the present invention, when the number of the excessively large bulk portions increases, a large number of small pores cannot be contained in the nanofiber sheet in some cases.

In the present invention, the area (Y value) of the inscribed circle of the bulk portion preferably satisfies the following general formula (1a) and more preferably satisfies the following general formula (1b).

$$0.52\pi X^2 \leq Y \leq 4.8 \ \mu m^2 \quad (1a)$$

$$0.55\pi X^2 \leq Y \leq 3 \ \mu m^2 \quad (1b)$$

In the present invention, a bulk portion whose inscribed circle has an area satisfying the requirement of the general formula (1) is present in the nanofiber sheet at $7 \times 10^{-3}$ portion/$\mu m^2$ or more. When a large number of bulk portions whose inscribed circles have areas satisfying the requirement of the general formula (1) are present, a force per unit area to be applied to each of the nanofibers of the nanofiber sheet of the present invention can be alleviated. Thus, the mechanical strength of the nanofiber sheet improves. In the present invention, the bulk portion whose inscribed circle has an area satisfying the requirement of the general formula (1) is preferably contained at $7.2 \times 10^{-3}$ portion/$\mu m^2$ or more, and is more preferably contained at $7.5 \times 10^{-3}$ portion/$\mu m^2$ or more.

In addition, in the present invention, it is preferred that bulk portions whose inscribed circles have areas satisfying the requirement of the general formula (1), the bulk portions constituting the nanofiber sheet, be present over a wide range, and it is more preferred that the bulk portions be uniformly present over the entirety of the nanofiber sheet. In the present invention, the bulk portions whose inscribed circles have areas satisfying the requirement of the general formula (1) are preferably contained in the nanofiber sheet at $7 \times 10^3$ portions/$mm^2$ or more, and are particularly preferably contained at $7 \times 10^5$ portions/$mm^2$ or more.

As described above, the bulk portion whose inscribed circle has an area satisfying the requirement of the general formula (1) is contained in the nanofiber sheet of the present invention at $7 \times 10^{-3}$ portion/$\mu m^2$ or more. Thus, many fine pores are uniformly present in the nanofiber sheet, more specifically between the nanofibers in the nanofiber sheet. Accordingly, the nanofiber sheet of the present invention maintains a high specific surface area.

(2) Nanofibers

The nanofibers constituting the nanofiber sheet of the present invention refer to fibers having lengths longer than their thicknesses.

In the present invention, the diameter of each of the nanofibers, i.e., the nanofiber diameter is determined by, for example, averaging measured values obtained when the measurement of the diameters of the nanofiber is conducted, which is obtained when the nanofiber sheet is observed from directly above as illustrated in FIG. 2A, at three arbitrary points. In the present invention, the nanofiber diameter can be set to 3 μm or less. However, the nanofiber diameter is desirably 1 nm or more in consideration of the ease of handling of the nanofibers themselves. In addition, the nanofiber diameter is preferably 2 μm or less in order that a nanofiber sheet having a high specific surface area may be obtained.

In the present invention, the nanofiber diameter is more preferably 1.78 μm or less in consideration of the general formula (1). The nanofiber diameter is still more preferably from 50 nm or more to 1.78 μm or less. Setting the nanofiber diameter to 50 nm or more makes the nanofibers easy to handle.

In the present invention, the sectional shapes of the nanofibers are not particularly limited, and specific examples thereof include a circular shape, an elliptical shape, a quadrangular shape, a polygonal shape, and a semicircular shape. The sectional shape of each of the nanofibers may not be any such accurate shape as listed above, and the shapes of arbitrary sections of the nanofiber may be different from each other.

When it is hypothesized that the shape of each of the nanofibers is a cylindrical shape, the diameter of a circle serving as a section of the cylinder corresponds to the nanofiber diameter. In addition, when the shape of the nanofiber is not a cylindrical shape, the nanofiber diameter corresponds to the length of the longest straight line passing a center of gravity in a section of the nanofiber. In the present invention, the length of the nanofiber is typically 10 or more times as large as the nanofiber diameter.

The shapes of the nanofibers (such as the sectional shapes of the fibers and the diameters of the fibers) can be confirmed by direct observation based on measurement with a scanning electron microscope (SEM) or a laser microscope.

A constituent material for the nanofibers in the nanofiber sheet of the present invention is not particularly limited as long as the material satisfies at least the following conditions: the material can form a bulk portion through the application of heat or the like and can form a fibrous structure. Specifically, a conventionally known material, e.g., an organic material typified by a resin material, or an inorganic material, such as silica, titania, or a clay mineral, can be used. For example, a hybrid material obtained by combining the organic material and the inorganic material can also be used.

One kind of the constituent materials for the nanofibers may be used alone, or two or more kinds thereof may be used in combination. The constituent material for the nanofibers is preferably an organic resin material because a bulk portion is easily obtained. In addition, out of the organic resin materials, a thermoplastic resin is preferred. In addition, when the organic resin material is used as the constituent material for the nanofibers, a material obtained by incorporating, for example, an organic low-molecular weight compound, an inorganic material, a fine particle, or a conventionally known filler into the organic resin material can also be used for the purpose of improving the mechanical strength of each of the nanofibers, and such materials may be appropriately combined.

As the constituent material for the nanofibers, for example, an organic resin material is used. Examples of the organic resin material to be used as the constituent material for the nanofibers include: a fluorine-containing polymer (e.g., a copolymer with another monomer, such as tetrafluoroethylene and polyvinylidene fluoride (PVDF) (the copolymer may be, for example, a copolymer of PVDF and hexafluoropropylene (PVDF-HFP))); a polyarylene (e.g., poly-p-phenylene oxide, poly(2,6-dimethylphenylene oxide), or an aromatic polyarylene such as poly(p-phenylene sulfide)); a polyimide; a polyamide; a polyamide-imide; polybenzimidazole; a modified polymer obtained by introducing a sulfonate group ($-SO_3H$), a carboxyl group ($-COOH$), a phosphate group, a sulfonium group, an ammonium group, or a pyridinium group into a polyolefin, polystyrene, a polyimide, or a polyarylene (aromatic); a modified polymer obtained by introducing a sulfonate group, a carboxyl group, a phosphate group, a sulfonium group, an ammonium group, or a pyridinium group into a skeleton of the fluorine-containing polymer; a polybutadiene-based compound; a polyurethane-based compound (including a polyurethane-based compound in an elastomer form or a gel form); a silicone-based compound; polyvinyl chloride; nylon; a polyarylate; a biodegradable polymer (e.g., polycaprolactone (PCL) and polylactic acid); a polyester (PES) (e.g., polyethylene terephthalate (PET)); and a poly(meth)acrylate derivative (e.g., polymethyl methacrylate (PMMA)).

One kind of the organic resin materials listed above may be used alone, or two or more kinds thereof may be used in combination. In addition, in the polymer material except the polyolefin, the polyimide, the polyarylene, and the fluorine-containing polymer, there can be used a modified polymer obtained by introducing a sulfonic group, a carboxyl group, a phosphate group, a sulfonium group, an ammonium group, or a pyridinium group. Further, a copolymer obtained by copolymerizing a plurality of kinds of monomers may be used. In the case of a polymer material that is hardly caused to melt such as polyimide, polyamide, polyamide-imide (PAI), and polybenzimidazole (PBI), the polymer material may be used in combination with, for example, a thermoplastic resin.

Examples of the inorganic material to be used as a constituent material for the nanofibers can include oxides of metal materials selected from Si, Mg, Al, Ti, Zr, V, Cr, Mn, Fe, Co, Ni, Cu, Sn, and Zn. More specific examples thereof can include metal oxides, such as silica ($SiO_2$), titanium oxide, aluminum oxide, alumina sol, zirconium oxide, iron oxide, and chromium oxide. In addition, a clay mineral such as montmorillonite (MN) can be used. The inorganic material is preferably contained in each of the nanofibers from the viewpoint of an improvement in mechanical strength of the nanofiber sheet because its mechanical strength tends to increase significantly in the bonding of the nanofibers.

In addition, when the constituent material for the nanofibers is a polymer having an imide structure, the nanofiber sheet tends to have a high mechanical strength in addition to high heat resistance because of the rigid and strong molecular structure of the polymer. Accordingly, a porous laminate that hardly deforms and has a high specific surface area tends to be obtained. In addition, the inorganic material is preferably added to the polymer having an imide structure from the viewpoint of an improvement in durability because the mechanical strength of the nanofiber sheet tends to significantly improve.

When a compound different from the constituent material for the nanofibers is contained together with the constituent material for the purpose of causing the compound to chemically act on the nanofibers, the temperature at which the compound acts is preferably equal to or less than the decomposition temperature of the constituent material for the nanofibers. In addition, details about the compound that can be contained together with the constituent material for the nanofibers are described later.

(3) Physical Properties of Nanofiber Sheet

In the nanofiber sheet of the present invention, the number of the nanofibers present on an arbitrary surface, an interval between the nanofibers, and the number of the laminated nanofibers can be appropriately selected and set in accordance with desired characteristics of the nanofiber sheet. For example, the bulk portions 3 are moderately formed in the nanofiber sheet 1 of each of FIG. 1A and FIG. 1B. The plurality of nanofibers 2 adjacent to each other are bonded to each other in each of the bulk portions 3, and hence the nanofiber sheet of the present invention becomes strong.

As a result, the nanofiber sheet of the present invention is excellent in mechanical strength, specifically wind pressure durability, and is hence advantageous for long-term use.

Incidentally, a tensile modulus is known as a physical property value for evaluating the mechanical strength of the nanofiber sheet. In the present invention, the tensile modulus of the nanofiber sheet is desirably 100 MPa or more. When the tensile modulus is less than 100 MPa, the mechanical strength of the sheet is weak and hence the sheet cannot be used for a long time period. When the nanofiber sheet is used as a constituent member for a dust-collecting filter, the tensile modulus of the nanofiber sheet is preferably 250 MPa or more.

In addition, the nanofiber sheet of the present invention preferably has a mechanical strength equal to or more than a certain level in consideration of, for example, the possibility that the sheet is utilized as a constituent member for a dust-collecting filter to be mounted to a vent hole. Specifically, the sheet is preferably capable of withstanding a certain wind pressure in addition to having a tensile modulus of 100 MPa or more. The certain wind pressure as used herein can be confirmed by a test for measuring whether or not one nanofiber film attached to cardboard breaks when a wind having a pressure of 50 Pa is blown with an air gun against the film for 2 minutes while a distance of 3 cm is provided between the air gun and the film.

The nanofiber sheet of the present invention has a certain thickness because the sheet is a sheet-like member formed by the entanglement of the nanofibers. In the present invention, the thickness of the nanofiber sheet is not particularly limited. In the present invention, the thickness of the nanofiber sheet is preferably from 1 μm or more to 1 mm or less, more preferably from 10 μm or more to less than 100 μm. A predetermined amount or more of the bulk portions each of which is produced by the bonding of the nanofibers and has a predetermined size are present in the nanofiber sheet of the present invention, and hence the sheet is excellent in mechanical strength and durability. Accordingly, the thickness can be set to be of the order of micrometers. When the thickness of the nanofiber sheet is less than 1 μm, the entanglement of the nanofibers does not sufficiently occur and hence the number of the bulk portions in the nanofiber sheet cannot be increased in some cases. On the other hand, when the thickness of the nanofiber sheet is set to less than 100 μm, the air permeability of the nanofiber sheet becomes particularly excellent.

In the nanofiber sheet of the present invention, a pore having a certain size is formed between the nanofibers. In the present invention, the average of the diameters of the pores formed between the nanofibers, i.e., pore diameters is desirably 5 μm or less, preferably from 10 nm or more to 5 μm or less, more preferably from 50 nm or more to 5 μm or less. When the average of the pore diameters is 10 nm or less, the pores of the nanofiber sheet are small on average and hence an effect based on the high specific surface area serving as an advantage of the nanofibers becomes small in some cases. On the other hand, when the average of the pore diameters is more than 5 μm, the pores of the nanofiber sheet are large on average and hence a mechanical strength desirable for the nanofiber sheet is not obtained in some cases.

A presence ratio represented by the ratio of the volumes of the nanofibers to the volume (including gap portions) of the nanofiber sheet of the present invention is known as a quantitative indicator of the local structure of the sheet. A plurality of definitions in accordance with how to determine the ratio of the volumes of the nanofibers are present for the presence ratio. Specifically, the presence ratio comes in a unit presence ratio, an average presence ratio, and the like. Herein, the unit presence ratio is the area ratio of the fibers in a portion in a fracture surface of the nanofiber sheet, the portion having a thickness comparable to a fiber diameter in a lamination direction. On the other hand, the average presence ratio is the average of the unit presence ratios in the thickness of a specific portion. In the following description, the presence ratio refers to the average presence ratio of a target portion unless otherwise stated, and in the present invention, the presence ratio (average presence ratio) of the nanofibers on the surface of the nanofiber sheet is preferably from 10% or more to 60% or less. When the presence ratio is less than 10%, the amount of the nanofibers present on the surface of the nanofiber sheet reduces, and hence the effect based on the high specific surface area serving as an advantage of the nanofibers becomes small. On the other hand, when the presence ratio is more than 60%, the adhesion of a slight amount of a substance to a pore portion may cause the clogging of the pore.

The diameters and shapes of the nanofibers in the nanofiber sheet of the present invention (e.g., the sectional shapes of the fibers and the diameters of the fibers) can be confirmed by, for example, direct observation through measurement with a scanning electron microscope (SEM) or a laser microscope. In addition, the area of the inscribed circle of a bulk portion and the number of the bulk portions satisfying the requirement of the general formula (1) can be confirmed by: capturing an image obtained by using the measurement with the scanning electron microscope (SEM) or the laser microscope in image analysis software; adjusting the scale of the image; drawing inscribed circles in sites corresponding to bulk portions after the adjustment; counting the areas of the inscribed circles; and counting the number of the drawn inscribed circles. In addition, the thickness of the nanofiber sheet can be confirmed with a thickness meter using reflection spectroscopy or a micrometer.

(4) Applications of Nanofiber Sheet

The nanofiber sheet of the present invention has a high specific surface area and can be used over a long time period even when an external factor such as friction is applied thereto. Accordingly, the sheet can be utilized as a constituent member for a dust-collecting filter for capturing a particle such as dust, dirt, and a fine particle the filter being mounted to a vent hole of a container for a toner or the like. However, the applications of the nanofiber sheet of the present invention are not limited thereto. For example, the sheet can be suitably utilized as a triboelectric charging material in a static electricity generator or an apparatus for selecting a particle with an electric field as well. In addition, the use mode of the nanofiber sheet of the present invention, which is not particularly limited, is, for example, the following mode: the sheet is rolled around a roller-like member.

When the nanofiber sheet of the present invention is utilized as, for example, a constituent member for a dust-collecting filter to be utilized in a vent hole portion, an array of the plurality of nanofiber sheets may be utilized for an improvement in mechanical strength.

(Method of Producing Nanofiber Sheet)

Next, a method of producing a nanofiber sheet of the present invention is specifically described. The method of producing a nanofiber sheet of the present invention includes the following steps (A) to (C):

(A) a solution-preparing step;

(B) a nanofiber sheet precursor-forming step of producing a nanofiber sheet precursor with the solution prepared in the step (A); and (C) a heating step of heating the nanofiber sheet precursor to bond nanofibers to each other.

In the following description, the step (B) is sometimes referred to as "spinning step." In the step (B), the nanofibers are entangled with each other and hence a sheet-like substance, i.e., the nanofiber sheet precursor is formed. Then, in the step (C), a bulk portion is formed in a portion where the nanofibers are brought into contact with each other by, for example, their entanglement. Accordingly, in the present invention, a sheet-forming step is the combination of the steps (B) and (C). The respective steps are described in detail below.

(A) Solution-Preparing Step

A constituent material for the nanofibers to be used when the production of the nanofiber sheet of the present invention is not particularly limited as long as the material can form a fibrous structure and can form a bulk portion at the time of the heating step to be described later. Specifically, a conventionally known material, e.g., an organic material typified by a resin material, or an inorganic material such as silica, titania and a clay mineral can be used. A hybrid material obtained by combining the organic material and the inorganic material can also be used. One kind of the constituent materials for the nanofibers may be used alone, or two or more kinds thereof may be used in combination. The constituent material for the nanofibers is preferably an organic resin material from the viewpoint that a bulk portion formed by the bonding of the nanofibers is easily formed. Of the organic resin materials, a thermoplastic resin is preferred. In addition, when the organic resin material is used as the constituent material for the nanofibers, a material obtained by mixing the organic resin material with, for example, an organic low-molecular weight compound, an inorganic material, a fine particle, or a conventionally known filler can also be used for the purpose of improving the mechanical strength of each of the nanofibers.

The step is the step of bringing the constituent material for the nanofibers into a solution state for the purpose of improving its ease of handling in the spinning step. A solvent to be used for bringing the constituent material for the nanofibers into a solution state in the step is not particularly limited as long as the solvent dissolves the constituent material for the nanofibers. In addition, one kind of the solvents to be used in the step may be used alone, or two or more kinds thereof may be used after having been mixed at an appropriate ratio. On the other hand, when a solution-like material is used as the nanofiber material, there is no need to use a solvent anew.

In addition, in the present invention, an organic low-molecular weight compound having chemical reactivity with the organic resin material serving as the constituent material for the nanofibers is preferably added to the solution to be prepared in the step for the purpose of effectively obtaining a bulk portion produced by the bonding of the nanofibers. The organic low-molecular weight compound is a compound also referred to as "crosslinking agent." In the present invention, the molecular weight of the organic low-molecular weight compound having chemical reactivity is not particularly limited, but from the viewpoint of its uniform dispersibility in the constituent material for the nanofibers, the molecular weight (number-average molecular weight) is preferably from 100 to 10,000. When the molecular weight (number-average molecular weight) is less than 100, the volatility of the organic low-molecular weight compound is raised and hence the volatilization of the organic low-molecular weight compound may occur in the course of the production of the nanofibers. On the other hand, when the molecular weight (number-average molecular weight) is more than 10,000, it may be difficult for the organic low-molecular weight compound and the constituent material for the nanofibers to be uniformly compatible with each other. When the organic low-molecular weight compound and the constituent material for the nanofibers are not uniformly compatible with each other, for example, the solution becomes clouded at the stage of the mixing of the compound and the material, or phase separation occurs in the course of the formation of the sheet. In addition, when the organic low-molecular weight compound is not uniformly compatible in the nanofibers, a bulk portion in the nanofiber sheet cannot be efficiently obtained.

In the step, the organic low-molecular weight compound having chemical reactivity to be used together with the constituent material for the nanofibers for efficiently obtaining a bulk portion in the nanofiber sheet of the present invention is not particularly limited. An organic compound having the following characteristics is preferred: the compound has at least one kind of structure having chemical reactivity and the structure is present in at least one site in a molecule of the compound. In addition, the structure having chemical reactivity may be present in two or more sites in one molecule thereof. Further, an organic compound having two or more kinds of the structures each having chemical reactivity can also be used as the organic low-molecular weight compound.

The structure having chemical reactivity is, for example, a structure having an unsaturated hydrocarbon, and is particularly preferably a vinyl group, a vinylidene group, or a vinylene group. In this case, a substituent site selected from a vinyl group, a vinylidene group, and a vinylene group may be bonded to hydrogen, or a saturated or unsaturated hydrocarbon group. However, the substituent site is not limited thereto, and the substituent may be bonded to an inorganic element or a metal element. The organic low-molecular weight compound having a vinyl group, a vinylidene group, or a vinylene group is specifically, for example, ethylene glycol dimethacrylate.

In addition to the structure having an unsaturated hydrocarbon, a heterocycle that undergoes ring-opening through the application of various kinds of energy to cause a chemical reaction is also given as the structure having chemical reactivity. Specific examples of the heterocycle that causes a chemical reaction through the application of energy include a cyclic ether, a cyclic ester, and a cyclic amine. In addition, ring structures of aziridine, oxirane, thiirane, 1H-azirine, 2H-azirine, oxirene, thiirene, azetidine, oxetane, thietane, azete, azolidine, oxolane, thiolane, azole, oxole, azinane, oxane, thiane, pyridine, azepane, oxepane, thiepane, azepine, oxepin, thiepine, and the like each cause a chemical reaction (ring-opening reaction) through the application of energy. Although the reason for the foregoing is unclear, in the present invention, a nanofiber sheet having a satisfactory mechanical strength can be produced by using an organic low-molecular weight compound containing a heterocycle, such as oxirane, oxazine, or oxetane, together with the constituent material for the nanofibers.

Specific examples of the organic low-molecular weight compound having a heterocycle include a bisphenol-type epoxy resin, a cresol novolac-type epoxy resin, benzoxazine, and oxetane alcohol. Commercially available organic low-molecular weight compounds are, for example, EPICLON (manufactured by DIC Corporation), benzoxazine manufactured by Shikoku Chemicals Corporation, and ARON OXETANE (manufactured by Toagosei Co., Ltd.).

One kind of the organic low-molecular weight compounds each having chemical reactivity to be used together with the constituent material for the nanofibers when the production of the nanofiber sheet of the present invention may be used, or two or more kinds thereof may be used in combination.

In the present invention, an oligomer (low-molecular weight polymer) is also included in the organic low-molecular weight compound. In general, the molecular weight of the oligomer to be used as the organic low-molecular weight compound can be easily measured by gel permeation chromatography (GPC).

Although the mechanism via which a bulk portion in the nanofiber sheet of the present invention is efficiently obtained by combining the organic resin material serving as the constituent material for the nanofibers with the organic low-molecular weight compound having chemical reactivity is unclear, the following hypothesis can be made. That is, the application of energy such as heat and light causes, for example, the following phenomena (a) to (c):
(a) physical association occurring in, or on the surfaces of, the nanofibers;
(b) the chemical crosslinking of the organic resin material by the organic low-molecular weight compound; and
(c) the polymerization of the organic low-molecular weight compound itself.

The occurrence of the phenomena (a) to (c) forms a polymer network not only in an independent nanofiber but also in a bulk portion formed in a portion where the nanofibers are bonded to each other. Thus, the area of the bulk portion can be increased without a significant increase in film density of the nanofiber sheet. In addition, by virtue of the bulk portion formed in the portion where the nanofibers are bonded to each other, the nanofiber sheet to be obtained becomes strong against a stress and has a high air permeability.

In the nanofiber sheet of the present invention, whether or not a chemical reaction occurs when the production of the sheet can be confirmed by, for example, infrared spectroscopy (IR) or Raman spectroscopy. A specific judgment approach is as described below. The IR spectra of the constituent material for the nanofibers and the organic low-molecular weight compound at a time point before the occurrence of the chemical crosslinking are measured. Then, the IR spectra of the samples are measured again after the chemical crosslinking, and whether or not the chemical reaction occurs can be judged based on whether or not both the appearance of a peak derived from the crosslinking and the reduction of a peak that has appeared before the crosslinking can be confirmed.

When the organic low-molecular weight compound having chemical reactivity is used in the step, a conventionally known latent catalyst can be added and used mainly for effectively performing the chemical reaction. Herein, the latent catalyst refers to a catalyst that generates a reaction active species (a cation, an anion, or a radical), which accelerates the crosslinking by the cyclic structure, through a predetermined stimulus such as heat, and the catalyst is, for example, an acid generator.

When the latent catalyst is used in the production of the nanofiber sheet of the present invention, the latent catalyst is preferably a thermal cationic polymerization initiator that generates a cation through heat. The thermal cationic polymerization initiator is inert at normal temperature, but when the initiator is heated and its temperature reaches a critical temperature (reaction starting temperature), the initiator cleaves to generate the cation. The cation causes the crosslinking by the organic low-molecular weight compound to progress. Examples of such compound include: an organometallic complex such as an aluminum chelate complex, an iron-allene complex, a titanocene complex, and an arylsilanol-aluminum complex; and a quaternary ammonium salt-type compound, a phosphonium salt-type compound, an iodonium salt-type compound, and a sulfonium salt-type compound each containing a hexafluoroantimonate ion ($SbF_6^-$), a tetrafluoroantimonate ion ($SbF_4^-$), a hexafluoroarsenate ion ($AsF_6^-$), a hexafluorophosphate ion ($PF_6^-$), or the like as an anionic component.

When the thermal cationic polymerization initiator is used in the production of the nanofiber sheet, the catalyst preferably acts at a temperature equal to or less than the decomposition temperature of a material to be used.

(B) Spinning Step (Nanofiber Sheet Precursor-Producing Step)

In the production of the nanofiber sheet of the present invention, the nanofibers constituting the sheet need to be formed. A method of forming the nanofibers is not particularly limited, but there are given, for example, an electrospinning method or a melt-blow method. In the present invention, only one kind of the methods may be selected and used, or two or more kinds thereof may be selected and appropriately combined. The electrospinning method, electrostatic spinning method out of the above-mentioned methods is a method involving forming the nanofibers in a state in which a high voltage (for example, about 20 kV) is applied between a syringe filled with a solution and a collector electrode. When the method is adopted, the solution extruded from the syringe is provided with charge to scatter in an electric field, but as a time elapses, a solvent in the scattered solution evaporates, and as a result, a thinned solute appears. The thinned solute becomes the fibers to adhere to a collector, such as a substrate.

The nanofibers are preferably produced through spinning by the electrospinning method having the following advantages (i) to (iii) out of the production methods listed above:
(i) various constituent materials for the nanofibers can be spun into fiber shapes;
(ii) it is relatively easy to control a fiber shape and a fiber having a thickness ranging from several nanometers to several tens of micrometers can be easily obtained; and
(iii) a production process is simple.

Figure 3:
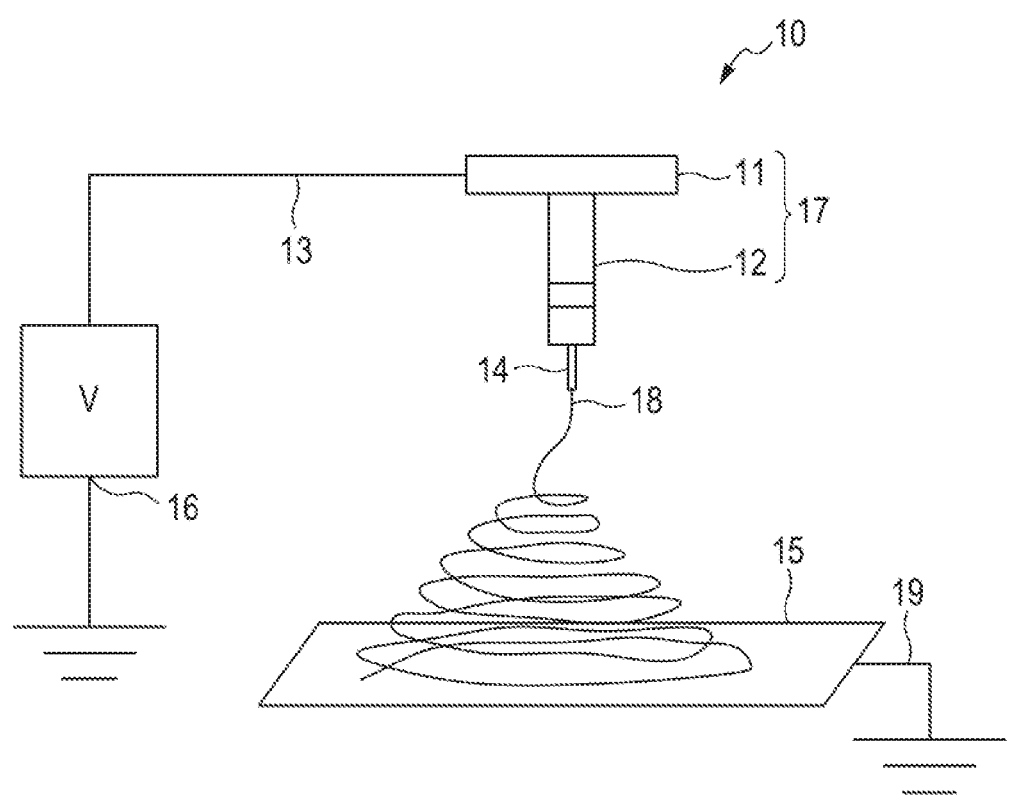
FIG. 3 is a schematic view for illustrating an apparatus for producing a nanofiber sheet precursor.

Now, the method of producing the nanofiber sheet precursor based on the spinning of the nanofibers by the electrospinning method is described with reference to the drawings. FIG. 3 is a schematic view for illustrating an example of an apparatus for producing the nanofiber sheet precursor.

A production of FIG. 3 specifically adopts a method involving extruding a solution stored in a storage tank 12 from a spinning nozzle 14. The solution extruded from the spinning nozzle 14 scatters in various directions and hence a nanofiber sheet precursor in which spun nanofibers are three-dimensionally entangled with each other is naturally produced. Accordingly, there is no need to twist the spun nanofibers in a later step.

Next, constituent members for the production apparatus 10 of FIG. 3 are described. The storage tank 12 configured to store the solution is arranged through a connecting portion 11. The connecting portion 11 is electrically connected to a high-voltage power source 16 through a wiring 13. In addition, the connecting portion 11 and the storage tank 12 are each a constituent member for a head 17. A collector 15 on which the spun nanofibers are collected is arranged so as to face the head 17 with a certain interval therebetween. The collector 15 is connected to the ground by a wiring 19.

The solution stored in the tank 12 is extruded from the tank 12 to the spinning nozzle 14 at a constant rate. A voltage of from 1 kV to 50 kV is applied to the spinning nozzle 14, and when electrical attraction exceeds the surface tension of the solution, a jet 18 of the solution is jetted toward the collector 15. At this time, a solvent in the jet 18 gradually volatilizes, and in the arrival of the jet 18 at the collector 15, a corresponding nanofiber is obtained. When spinning is performed, the solution set to a condition under which the solution is turned into nanofibers is introduced into the tank 12.

An object to be stored in the tank 12 when the spinning is not limited to the solution and a melt heated to its melting point or more may be utilized.

Incidentally, when the organic low-molecular weight compound having chemical reactivity is added to the solution together with the constituent material for the nanofibers in the solution-preparing step, in the formation of the nanofibers in the step, the organic low-molecular weight compound can be caused to adhere to the inside or surface of each of the formed nanofibers. The organic low-molecular weight compound that has adhered to the surface of each of the nanofibers is brought into a state of being interposed between the nanofibers in at least part of the portions where the nanofibers are in contact with each other in the entanglement of the nanofibers in the course of the progress of the spinning step.

(C) Heating Step

In the production of the nanofiber sheet of the present invention, energy is applied to the nanofiber sheet precursor obtained in the spinning step. The application of the energy causes the following (C1) and/or (C2) to progress:
(C1) physical association, such as fusion, occurring in, or on the surfaces of, the nanofibers; and
(C2) a chemical reaction occurring in, or on the surfaces of, the nanofibers.

The progress of the (C1) and/or the (C2) produces a bulk portion in a portion where the nanofibers are in contact with each other.

In the present invention, a method of applying energy needed for forming a bulk portion is not particularly limited, but examples thereof include heat application, UV irradiation, electron beam irradiation, ultrasonic wave application, and electromagnetic wave application. Of those, a method based on the heat application is preferred in terms of, for example, uniformity and simpleness.

A specific approach for a heating treatment for the nanofibers needed for the formation of a bulk portion is described below. A specific method for the heating treatment is not particularly limited. For example, heating with a heater, heating with warm air, heating with an infrared ray, heating with a microwave, or heating with an ultrasonic wave can be used, and any such method only needs to be appropriately selected depending on a situation in which the method is used and the like.

For example, the following methods can each be suitably used as a specific method of heating the nanofiber sheet precursor: a method involving subjecting the nanofiber sheet precursor to hot pressing; a method involving subjecting the nanofiber sheet precursor to a heat treatment with an industrial dryer, an oven, or the like; and a method involving warming the nanofiber sheet precursor with a heater once and then further subjecting the precursor to post heating with an oven. Of those, a method involving heating the nanofiber sheet precursor under an unpressurized condition is preferred. In addition, out of such methods, a method involving subjecting the precursor to a heat treatment with an oven is particularly preferred because of the following reason: the entirety of the nanofiber sheet precursor can be evenly and uniformly heated, and hence a bulk portion whose area has been properly controlled can be formed without the impairment of the shapes of the nanofibers. When heating the nanofiber sheet precursor, the heating may be performed from one surface of the nanofiber sheet precursor. The presence ratio and presence distribution of the bulk portions of the nanofiber sheet to be obtained at this time may vary in its thickness direction, but no problems occur as long as the nanofiber sheet has a pore having a predetermined pore diameter. When the thickness of the nanofiber sheet precursor is from 1 µm or more to 1 mm or less, the presence ratio and presence distribution of the bulk portions of the nanofiber sheet to be obtained are substantially uniform in the thickness direction.

The step is performed at a temperature equal to or less than the temperature at which the nanofibers cannot maintain their shapes and the nanofibers melt. In addition, the temperature at which the step is performed can be appropriately selected in accordance with, for example, a material to be used and desired physical properties of the nanofiber sheet to be produced as long as the temperature is less than the decomposition temperature of the constituent material for the nanofibers. For example, when the organic resin material is used as the constituent material for the nanofibers and the organic resin material has a Vicat softening temperature or a deflection temperature under load of 150° C. or less, the heating temperature of the nanofiber sheet is appropriately set based on the Vicat softening temperature or the deflection temperature under load. Specifically, the heating temperature of the nanofiber sheet is more preferably set to fall within the range of from (Vicat softening temperature or deflection temperature under load−20° C.) or more to (Vicat softening temperature or deflection temperature under load+30° C.) or less because the setting facilitates the formation of a bulk portion in the nanofiber sheet of the present invention.

Incidentally, when the organic low-molecular weight compound having chemical reactivity is added to the solution together with the constituent material for the nanofibers in the solution-preparing step, the performance of the step causes, for example, the chemical crosslinking of the organic resin material by the organic low-molecular weight compound interposed between the nanofibers or the polymerization of the organic low-molecular weight compound itself through the chemical reaction of the organic low-molecular weight compound. In addition, the chemical reaction (the chemical crosslinking or the polymerization) bonds the nanofibers to each other and forms a bulk portion in a portion where the nanofibers are bonded to each other. The bulk portion is formed by complex entanglement of: the molecules of the organic resin material constituting the nanofibers; a crosslinked structure derived from the organic low-molecular weight compound that crosslinks the molecules of the organic resin material; and a molecule produced by a reaction between the molecules of the organic low-molecular weight compound. In addition, the bulk portion provides a basis for a polymer network to be formed by the organic resin material.

The step is particularly effective in improving the mechanical strength of the nanofiber sheet. Meanwhile, in the step, the molecules of the organic low-molecular weight compound in each of the nanofibers react with each other, or the organic low-molecular weight compound reacts with the organic resin material constituting the nanofibers. As a result, the entanglement of the organic resin material or the organic resin material crosslinked by the organic low-molecular weight compound and a product of a reaction between the molecules of the organic low-molecular weight compound occurs to improve the mechanical strength of each of the nanofibers themselves. When the mechanical strength of each of the nanofibers themselves improves as described above, the mechanical strength of the nanofiber sheet also improves in accordance with the improvement.

Now, the present invention is described in detail by way of Examples. However, the present invention is not limited to Examples to be described below. In addition, those obtained by appropriately changing or modifying Examples to be described below to the extent that such change or modification do not deviate from the gist of the present invention are also included in the present invention.

(Measurement Methods and Evaluation Methods)

Measurement methods and evaluation methods for the physical properties of nanofiber sheets produced in Examples or Comparative Examples to be described below are described.

(1) Nanofiber Diameter

The diameter of a nanofiber in a nanofiber sheet, i.e., a nanofiber diameter was obtained by measurement with a laser microscope (manufactured by Keyence Corporation). Specifically, first, a gray scale image was obtained by observing the nanofiber sheet with the laser microscope at a magnification of 200. Next, the gray scale image was enlarged at a magnification of 300 with a "Profile", and then an average value obtained by measuring the diameters of the nanofiber at three sites was defined as the nanofiber diameter.

(2) Average Pore Diameter

The average pore diameter of a nanofiber sheet was obtained through measurement with Palm Porometer (manufactured by Porous Materials, Inc.) serving as a pore size distribution-evaluating apparatus by a bubble point method. GALWICK (manufactured by Porous Materials, Inc.) was used as a solution in which the nanofiber sheet was immersed.

(3) Area of Inscribed Circle of Bulk Portion and Number of Inscribed Circles Per Unit Area The area of the inscribed circle of a bulk portion was obtained by measurement with a laser microscope (manufactured by Keyence Corporation). Specifically, a gray scale image obtained by observing a nanofiber sheet with the laser microscope was provided with a scale and captured in image analysis software "Image J", and the binarization of the image was performed. After that, the area of an inscribed circle drawn so as to be inscribed in the border of the bulk portion was determined. Next, when the average of the nanofiber diameters was represented by X μm, and the area of the inscribed circle of the bulk portion was represented by Y μm$^2$, the number of the bulk portions satisfying the following general formula (1) was counted, and the number of the inscribed circles per unit area was obtained by dividing the number by the area of the image (the entire area of the nanofiber sheet).

$$0.5\pi X^2 \leq Y \leq 5 \ \mu m^2 \quad (1)$$

(4) Presence Ratio of Nanofibers on Surface of Nanofiber Sheet

The presence ratio of nanofibers on the surface of a nanofiber sheet was obtained by measurement with a laser microscope (manufactured by Keyence Corporation). Specifically, the presence ratio was obtained by: capturing a gray scale image obtained by the measurement of the nanofiber sheet with the laser microscope in image analysis software "A-ZO KUN" (manufactured by Asahi Kasei Engineering Corporation); and performing area ratio measurement.

(5) Average Thickness of Nanofiber Sheet

The average thickness of a nanofiber sheet was obtained by determining the average of values obtained by measuring its thicknesses with QUICK MICRO (manufactured by Mitutoyo Corporation) at three sites.

(6) Evaluation of Mechanical Strength of Nanofiber Sheet

The mechanical strength of a nanofiber sheet was evaluated by a method to be described below.

Figure 4:
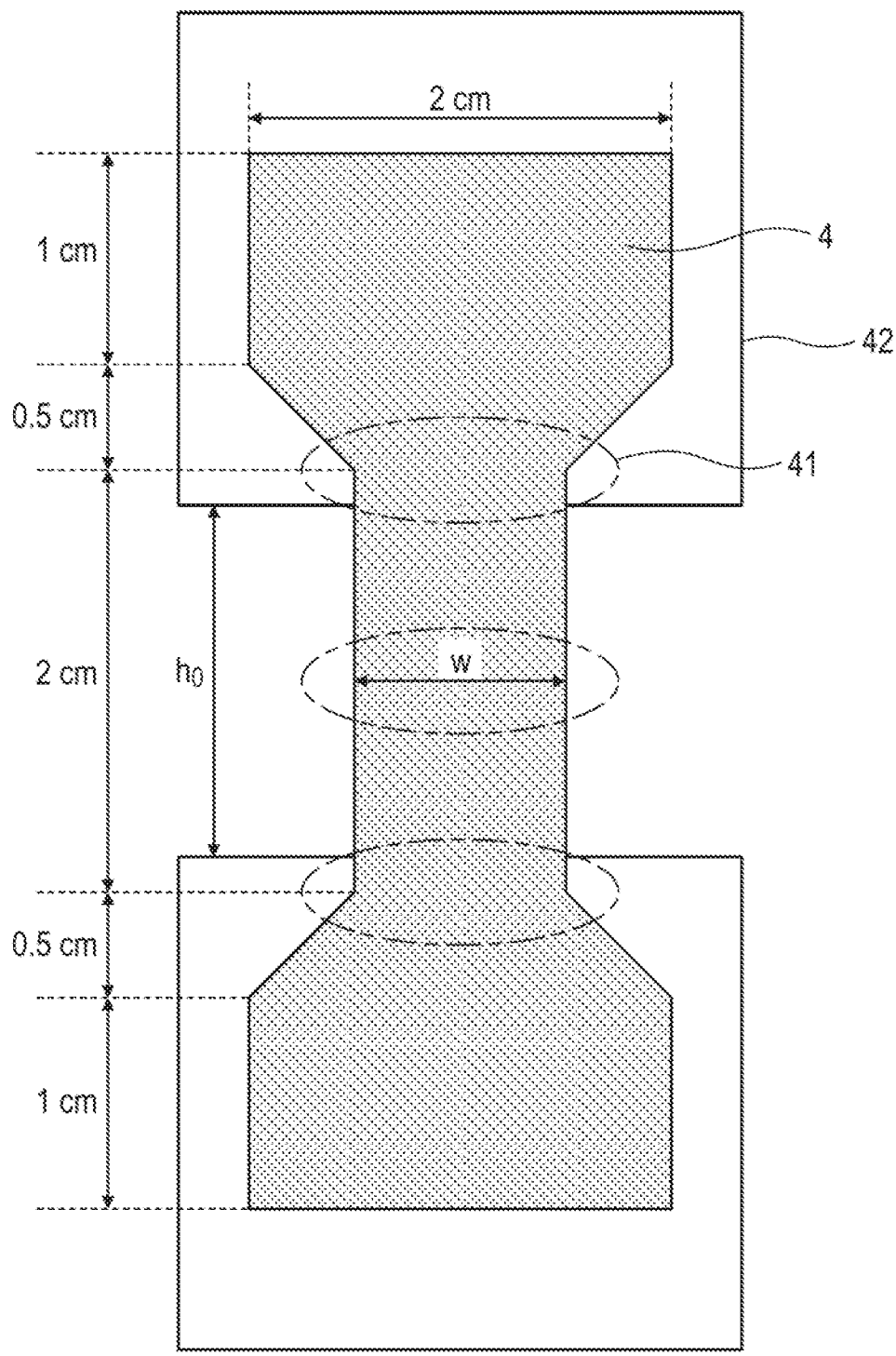
FIG. 4 is a schematic view for illustrating a test piece produced in the evaluation of the nanofiber sheet for its mechanical strength.

First, the nanofiber sheet was punched into a dumbbell shape as represented by reference numeral 4 of FIG. 4. Next, the thicknesses of three dash dotted line portions each represented by reference numeral 41 in FIG. 4 were measured with a micrometer, and the average of these values was defined as the thickness (t) of the nanofiber sheet. Next, the widths of the three dash dotted line portions each represented by reference numeral 41 were measured with a vernier caliper, and the average of these values was defined as the width (w) of the nanofiber sheet. Next, the nanofiber sheet of FIG. 4 was held in a tensile tester. In this case, a site at which the nanofiber sheet was held was set to a rectangular region represented by reference numeral 42 in FIG. 4. It is because a value in which the area of a dumbbell grip portion is not considered needs to be obtained for accurately measuring the mechanical strength of the nanofiber sheet that the site at which the sheet is held is designated as represented by reference numeral 42 of FIG. 4. Next, the length of a site represented by $h_0$ in FIG. 4 was measured with a vernier caliper. In FIG. 4, $h_0$ means a tensile initial length. Next, the thickness (t), the width (w), and the tensile initial length ($h_0$) were input in measurement software. Next, values for the height and stroke of the tensile tester were each reset to zero. Next, the nanofiber sheet was pulled at 1 mm/min. The length by which the nanofiber sheet was pulled, i.e., a tensile length (Δh) was calculated in advance by using a value calculated with the software. In addition, after the fracture of the nanofiber sheet had been visually observed, the pulling was stopped. A tensile force applied to the nanofiber sheet when the fracture of the nanofiber sheet was visually observed was defined as a test force (N).

A tensile modulus (G) was determined by using the values for the thickness (t), the width (w), the tensile length (Δh), and the test force (N) obtained by the foregoing process. The tensile modulus (G) was obtained by: calculating a strain ($\varepsilon$) and a stress ($\sigma$) from the following formula (6-1) and the following formula (6-2), respectively; and determining the slope of a tangent up to a yield point when a stress-strain curve was drawn through the use of the following formula (6-3).

$$\Delta h/h_0 = \varepsilon \quad (6\text{-}1)$$

$$N/(wt) = \sigma \quad (6\text{-}2)$$

$$\sigma/\varepsilon = G \quad (6\text{-}3)$$

The tensile test was performed on each nanofiber sheet twice, and the average of the resultant values was defined as the tensile modulus of the nanofiber sheet. In the case where a large difference occurred between the respective values when the performance of the test twice, the tensile test was performed three or more times. In this case, the average of two values that differed from each other to the smallest extent out of the values obtained by the test was defined as the tensile modulus of the nanofiber sheet. In the measurement, a value was determined while a Poisson's ratio in association with a change in shape of the sheet at the time of the tensile measurement was ignored.

As described above, bulk portions are formed by the deformation of part of the nanofibers in a nanofiber sheet, but in the case where, out of the bulk portions, many bulk portions whose inscribed circles have areas falling within a certain range are present, the tensile modulus of the nanofiber sheet increases. In this case, it is apparent that the nanofiber sheet is improved in mechanical strength and hence becomes excellent in durability, such as wind pressure durability. In other words, it is shown that a nanofiber sheet whose tensile modulus increases at a high ratio has sufficient wind pressure durability because the mechanical strength of the nanofiber sheet itself improves. Accordingly, the nanofiber sheet whose tensile modulus increases at a high ratio can be used over a long time period.

(7) Evaluation of Wind Pressure Durability of Nanofiber Sheet

The wind pressure durability of a nanofiber sheet was verified by evaluating whether or not the one nanofiber sheet attached to cardboard broke when a wind having a pressure of 0.1 MPa was blown with an air gun against the sheet for 2 minutes while a distance of 3 cm was provided between the air gun and the sheet. An evaluation method is as follows: whether or not the nanofiber sheet broke or was damaged after the blowing with the air gun was visually observed. When the breakage of, or damage to, the nanofiber sheet was not observed, the nanofiber sheet was judged to have satisfactory wind pressure durability. On the other hand, when the breakage of, or damage to, the nanofiber sheet was not observed, but the deformation thereof was observed, the nanofiber sheet was judged to have acceptable wind pressure durability, and when the breakage of, or damage to, the nanofiber sheet was observed, the nanofiber sheet was judged to have poor wind pressure durability.

(8) Evaluation of Air Permeability of Nanofiber Sheet

The evaluation of the air permeability of a nanofiber sheet was performed as follows: when the nanofiber sheet had an air permeability measured with an air permeability tester at 125 Pa of 0.4 cc/cm$^2$/sec or more, the nanofiber sheet was judged to have a satisfactory air permeability.

Example 1

(1) Solution-Preparing Step

A polyamide-imide (PAI) solution serving as an organic resin material (manufactured by Hitachi Chemical Company, Ltd.: HPC-5020, varnish solution) and F-a-type benzoxazine serving as an organic low-molecular weight compound (manufactured by Shikoku Chemicals Corporation) were mixed. At this time, a mixing ratio between PAI and the F-a-type benzoxazine was set to 3:1 in terms of a weight ratio (the mixing ratio of the F-a-type benzoxazine in the solute was 25 wt %). Next, SI-100L serving as an aromatic sulfonium salt-based latent catalyst (manufactured by Sanshin Chemical Industry Co., Ltd.) prepared in advance was added and mixed to the mixture at a ratio of 2 wt % with respect to the F-a-type benzoxazine. Thus, a solution was prepared. Next, the solution was used in the next step.

(2) Nanofiber Sheet Precursor-Forming Step (Spinning Step)

The solution prepared in the section (1) was jetted and spun by an electrospinning method. Thus, a nanofiber sheet precursor formed by physical entanglement of nanofibers each having PAI, the F-a-type benzoxazine, and an unvolatilized solvent was produced. In the step, specifically, first, the head portion 17 constituting the electrospinning apparatus of FIG. 3 (manufactured by MECC Company Ltd.) was assembled by performing the following (2-1) and (2-2) in the stated order. The head portion 17 was placed so that the value of a measure placed in the apparatus was positioned at 157 mm.

(2-1) the Mounting of the Connecting Portion 11 (Clip Spinneret)

(2-2) The mounting of the tank 12$^{(Note\ 1)}$ on the connecting portion 11

(Note 1: the tank 12 is filled with the solution prepared in the section (1) in advance.)

Next, the solution filled into the tank 12 was jetted toward the collector 15 by applying a voltage of 21.5 kV to the spinning nozzle 14. Thus, the nanofibers were obtained. The resultant nanofibers were obtained in the following mode: the nanofibers were integrated on the collector 15. Next, the integrated nanofibers, i.e., the nanofiber sheet precursor was used in the next step.

(3) Heating Step

The nanofiber sheet precursor obtained in the section (2) was peeled from the collector 15, and was then mounted on a polytetrafluoroethylene sheet attached onto a glass plate. Next, the nanofiber sheet precursor was subjected to a heat treatment with an oven at 160° C. for 2 hours. Thus, a nanofiber sheet having a crosslinked portion produced by a chemical reaction between each of the nanofibers and the organic low-molecular weight compound was obtained. The "heating step" as used herein has the same meaning as that of the "step of forming bulk portions formed by the deformation of part of the nanofibers."

(4) Evaluations of Nanofiber Sheet

Figure 5:
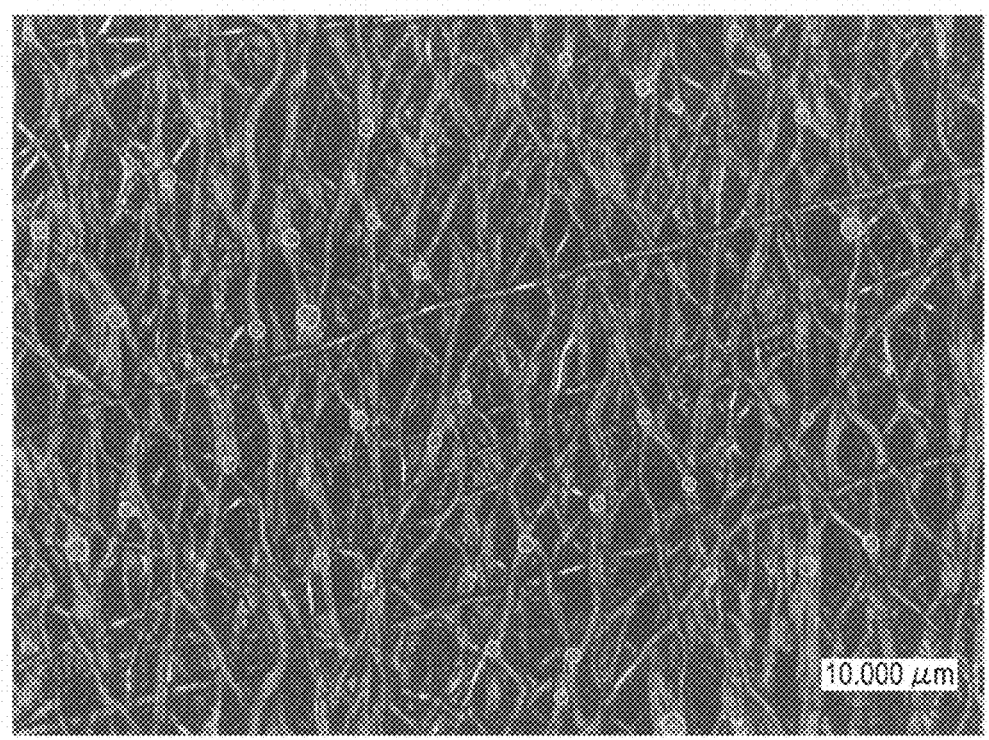
FIG. 5 is a laser microscope photograph of a nanofiber sheet produced in Example 1.

The physical properties of the resultant nanofiber sheet were measured and evaluated based on the measurement methods and the evaluation methods. The results are shown in Tables 2 and 3. FIG. 5 is a view for showing a laser microscope photograph of the nanofiber sheet produced in this example. FIG. 5 is a photograph obtained by photographing the front surface side of the nanofiber sheet. It was confirmed that as shown in FIG. 5, the nanofiber sheet obtained in this example was obtained by integrating the nanofibers and had a plurality of bulk portions (circles in FIG. 5).

Example 2

(1) Solution-Preparing Step

A polyamide imide (PAI) solution serving as an organic resin material (manufactured by Hitachi Chemical Company, Ltd.: HPC-5020, varnish solution) and a cresol novolac-type epoxy resin serving as an organic low-molecular weight compound (manufactured by DIC Corporation: N-695) were mixed. At this time, a mixing ratio between PAI and the cresol novolac-type epoxy resin was set to 3:1 in terms of a weight ratio (the mixing ratio of the cresol novolac-type epoxy resin in the solute was 25 wt %). Next, SI-100L serving as an aromatic sulfonium salt-based latent catalyst (manufactured by Sanshin Chemical Industry Co., Ltd.) prepared in advance was added and mixed to the mixture at a ratio of 2 wt % with respect to the cresol novolac-type epoxy resin.

(2) Nanofiber Sheet Precursor-Forming Step (Spinning Step)

A nanofiber sheet precursor was obtained by the same method as that of the section (2) of Example 1 except that in the section (2) of Example 1, the voltage to be applied to the spinning nozzle 14 was changed as shown in Table 1.

(3) Heating Step

A nanofiber sheet was obtained through the heating of the nanofiber sheet precursor by the same method as that of the section (3) of Example 1.

(4) Evaluations of Nanofiber Sheet

The physical properties of the resultant nanofiber sheet were measured and evaluated by the same methods as those of the section (4) of Example 1. The results are shown in Tables 2 and 3.

Example 3

(1) Solution-Preparing Step

Polymethyl methacrylate serving as an organic resin material (PMMA, manufactured by Sumitomo Chemical Co., Ltd.: SUMIPEX MM) and N,N'-dimethylacetamide (DMAC, manufactured by Kishida Chemical Co., Ltd.) were mixed to prepare a DMAC solution containing PMMA at a weight ratio of 28 wt %. Next, the DMAC solution prepared in advance and a bisphenol A-type epoxy resin serving as an organic low-molecular weight compound (manufactured by Konishi Co., Ltd.: QUICK 5 A) were mixed. At this time, a mixing ratio between PMMA and the low-molecular weight compound was set to 3:1 in terms of a weight ratio (the mixing ratio of the bisphenol A-type epoxy resin in the solute was 25 wt %). Next, SI-100L serving as an aromatic sulfonium salt-based latent catalyst (manufactured by Sanshin Chemical Industry Co., Ltd.) prepared in advance was added and mixed to the mixture at a ratio of 2 wt % with respect to the bisphenol A-type epoxy resin. Thus, a solution was prepared.

(2) Nanofiber Sheet Precursor-Forming Step (Spinning Step)

A nanofiber sheet precursor was obtained through the spinning of the nanofibers by the same method as that of the section (2) of Example 1 except that in the section (2) of Example 1, the voltage to be applied to the spinning nozzle 14 was changed as shown in Table 1.

(3) Heating Step

A nanofiber sheet was obtained through the heating of the nanofiber sheet precursor by the same method as that of the section (3) of Example 1 except that in the section (3) of Example 1, the heating temperature was changed as shown in Table 1.

(4) Evaluations of Nanofiber Sheet

The physical properties of the resultant nanofiber sheet were measured and evaluated by the same methods as those of Example 1. The results are shown in Tables 2 and 3.

Example 4

(1) Solution-Preparing Step

Polymethyl methacrylate serving as an organic resin material (PMMA, manufactured by Sumitomo Chemical Co., Ltd.: SUMIPEX MM) and N,N'-dimethylacetamide (DMAC, manufactured by Kishida Chemical Co., Ltd.) were mixed to prepare a DMAC solution containing PMMA at a weight ratio of 28 wt %. Next, the DMAC solution prepared in advance and ethylene glycol dimethacrylate serving as an organic low-molecular weight compound (manufactured by Hitachi Chemical Company, Ltd.: FANCRYL FA-121M) were mixed. At this time, a mixing ratio between PMMA and the low-molecular weight compound was set to 3:1 in terms of a weight ratio (the mixing ratio of ethylene glycol dimethacrylate in the solute was 25 wt %). Next, SI-100L serving as an aromatic sulfonium salt-based latent catalyst (manufactured by Sanshin Chemical Industry Co., Ltd.) prepared in advance was added and mixed to the mixture at a ratio of 0.5 wt % with respect to ethylene glycol dimethacrylate. Thus, a solution was prepared.

(2) Nanofiber Sheet Precursor-Forming Step (Spinning Step)

A nanofiber sheet precursor was obtained by the same method as that of the section (2) of Example 1 except that in the section (2) of Example 1, the voltage to be applied to the spinning nozzle 14 was changed as shown in Table 1.

(3) Heating Step

A nanofiber sheet was obtained through the heating of the nanofiber sheet precursor by the same method as that of the section (3) of Example 1 except that in the section (3) of Example 1, the heating temperature was changed as shown in Table 1.

(4) Evaluations of Nanofiber Sheet

The physical properties of the resultant nanofiber sheet were measured and evaluated by the same methods as those of the section (4) of Example 1. The results are shown in Tables 2 and 3.

Comparative Example 1

(1) Solution-Preparing Step

Polyethylene terephthalate serving as an organic resin material (PET, manufactured by Mitsubishi Chemical Corporation: NOVAPEX GM700) and 1,1,1,3,3,3-hexafluoro-2-propanol (HFIP, manufactured by Tokyo Chemical Industry Co., Ltd.) were mixed. Thus, a HFIP solution containing PET at a weight ratio of 6.0 wt % was prepared. The HFIP solution thus prepared was used in the next step.

(2) Nanofiber Sheet Precursor-Forming Step (Spinning Step)

A nanofiber sheet precursor was obtained by the same method as that of the section (2) of Example 1 except that in the section (2) of Example 1, the voltage to be applied to the spinning nozzle 14 and the ejection speed were changed as shown in Table 1.

(3) Heating Step

A nanofiber sheet was obtained by the same method as that of the section (3) of Example 1 except that in the section (3) of Example 1, the heating temperature was changed as shown in Table 1.

(4) Evaluations of Nanofiber Sheet

The physical properties of the resultant nanofiber sheet were measured and evaluated by the same methods as those of the section (4) of Example 1. The results are shown in Tables 2 and 3.

Comparative Example 2

(1) Solution-Preparing Step

Polymethyl methacrylate serving as an organic resin material (PMMA, manufactured by Sumitomo Chemical Co., Ltd.: SUMIPEX MM) and N,N'-dimethylacetamide (DMAC, manufactured by Kishida Chemical Co., Ltd.) were mixed to prepare a DMAC solution containing PMMA at a weight ratio of 28 wt %. The DMAC solution thus prepared was used in the next step.

(2) Nanofiber Sheet Precursor-Forming Step (Spinning Step)

A nanofiber sheet precursor was obtained by the same method as that of the section (2) of Example 1 except that in the section (2) of Example 1, the voltage to be applied to the spinning nozzle 14 was changed as shown in Table 1.

(3) Heating Step

A nanofiber sheet was obtained by the same method as that of the section (3) of Example 1 except that in the section (3) of Example 1, the heating temperature was changed as shown in Table 1.

(4) Evaluations of Nanofiber Sheet

The physical properties of the resultant nanofiber sheet were measured and evaluated by the same methods as those of Example 1. The results are shown in Tables 2 and 3.

Comparative Example 3

(1) Solution-Preparing Step

A polybenzimidazole varnish serving as an organic resin material (PBI, manufactured by Sato Light Industrial Co., Ltd.: MRS0810H, DMAc (varnish) solution) was concentrated under reduced pressure to prepare a solution containing PBI at a weight ratio of 22.0 wt %. The solution thus prepared was used in the next step.

(2) Spinning Step (Nanofiber Sheet-Forming Step)

A nanofiber sheet was obtained by the same method as that of the section (2) of Example 1 except that in the section (2) of Example 1, the voltage to be applied to the spinning nozzle 14 was changed as shown in Table 1. The nanofiber sheet obtained in this comparative example was subjected to evaluations to be described later without being subjected to any heat treatment.

(3) Evaluations of Nanofiber Sheet

The physical properties of the resultant nanofiber sheet were measured and evaluated by the same methods as those of Example 1. The results are shown in Tables 2 and 3.

TABLE 1

|  | Applied voltage [V] | Ejection speed [mL/h] | Heating temperature [° C.] |
|---|---|---|---|
| Example 1 | 21.5 | 1 | 160 |
| Example 2 | 20.0 | 1 | 160 |
| Example 3 | 19.5 | 1 | 140 |
| Example 4 | 18.5 | 1 | 140 |
| Comparative Example 1 | 19.5 | 0.5 | 160 |
| Comparative Example 2 | 18.0 | 1 | 110 |
| Comparative Example 3 | 18.5 | 1 | (No heating) |

TABLE 2

|  | Nanofiber diameter [µm] | Pore diameter[Note 1] [µm] | Number of bulk portions[Note 2] [$10^{-3}$ portion/µm²] | Nanofiber presence ratio [%] | Thickness[Note 3] [µm] |
|---|---|---|---|---|---|
| Example 1 | 0.6 | 1.7 | 9.09 | 50 | 10 |
| Example 2 | 0.9 | 2.1 | 7.65 | 46 | 18 |
| Example 3 | 1.1 | 2.4 | 8.02 | 44 | 22 |
| Example 4 | 0.8 | 1.4 | 7.26 | 27 | 17 |
| Comparative Example 1 | 0.5 | 2.6 | 0.49 | 16 | 52 |
| Comparative Example 2 | 1.2 | 2.2 | 0 | 28 | 16 |
| Comparative Example 3 | 0.5 | 4.2 | 0 | 20 | 29 |

[Note 1] The average of pore diameters
[Note 2] The number of bulk portions satisfying the requirement of the general formula (1)
[Note 3] The average of thicknesses

TABLE 3

|  | Tensile modulus [MPa] | Wind pressure durability(Note 1) | Air permeability(Note 2) |
| --- | --- | --- | --- |
| Example 1 | 644 | ○ | ○ |
| Example 2 | 473 | ○ | ○ |
| Example 3 | 324 | ○ | ○ |
| Example 4 | 300 | ○ | ○ |
| Comparative Example 1 | 78 | Δ | — |
| Comparative Example 2 | 42 | x | — |
| Comparative Example 3 | 5.7 | x | — |

(Note 1)The evaluation of wind pressure durability
○The breakage of a nanofiber sheet, damage thereto, and the deformation thereof were not observed.
ΔThe deformation of a nanofiber sheet was observed (the breakage of, or damage to, the nanofiber sheet was not observed).
x: The breakage of, or damage to, a nanofiber sheet was observed.
(Note 2)The evaluation of an air permeability
○The air permeability was 0.4 cc/cm$^2$/sec or more at 125 Pa.

The facts that were able to be made clear or confirmed in Examples and Comparative Examples are described below.

The nanofiber sheets produced in Examples (Examples 1 to 4) were each found to significantly increase in tensile modulus as compared to that of the nanofiber sheet of Comparative Example 1. The number of bulk portions satisfying the requirement of the general formula (1) out of the bulk portions in the nanofiber sheet of Comparative Example 1 was less than $7 \times 10^{-3}$ portion/μm$^2$. It is assumed from the foregoing that a bulk portion was formed by the heating step in the nanofiber sheet of Comparative Example 1, but the bulk portion was small, and hence the tensile modulus and wind pressure durability of the nanofiber sheet itself were low.

In Comparative Example 2, the nanofiber sheet precursor was subjected to a heat treatment at 110° C. However, as a result of image observation, each of the bulk portions produced by the heat treatment was small, i.e., no bulk portion satisfying the requirement of the general formula (1) was present. It is assumed from the foregoing that the tensile modulus of the nanofiber sheet obtained in Comparative Example 2 was not sufficient, and the sheet itself was broken by wind pressure.

Figure 6:
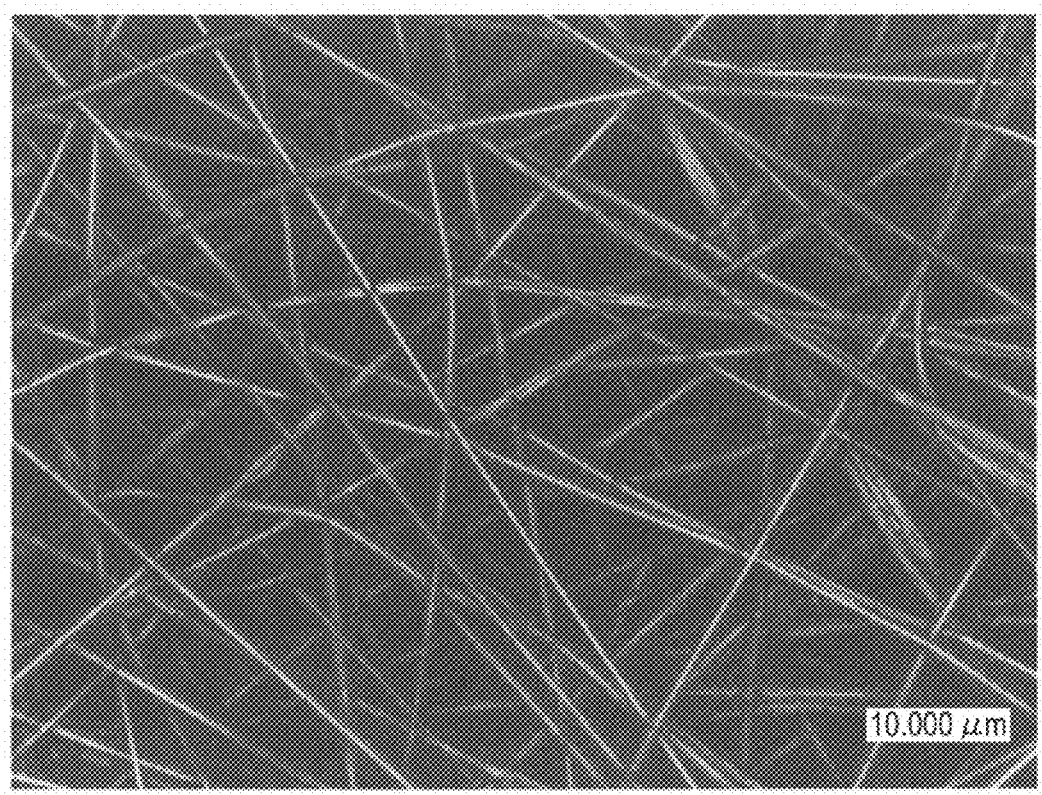
FIG. 6 is a laser microscope photograph of a nanofiber sheet produced in Comparative Example 3.

FIG. 6 is a view for showing a laser microscope photograph of the nanofiber sheet produced in Comparative Example 3. The heating step was omitted in the nanofiber sheet produced in Comparative Example 3, and hence as shown in FIG. 6, no bulk portion could be observed in the produced nanofiber sheet, and the nanofibers constituting the nanofiber sheet were independent of each other. It is assumed from the foregoing that despite the fact that PBI credited with having a high mechanical strength was used as a material, a stress was not sufficiently dispersed in the application of the stress to the sheet and the loosening of the nanofibers occurred, and hence a sufficient mechanical strength was not obtained and the sheet itself was broken by wind pressure.

As can be seen from comparison between Examples (Examples 1 to 4) and Comparative Examples (Comparative Examples 1 to 3), when a specific organic low-molecular weight compound is mixed in a solution to be used at the time of the spinning step, a produced nanofiber sheet has a sufficient mechanical strength. This is assumed to be because the following phenomena (a) and (b) occur at the time of the heating step (the heating of the nanofiber sheet precursor):

(a) physical association of polymer molecules caused in, or on the surfaces of, the nanofibers by the fusion of the nanofibers; and
(b) chemical crosslinking caused by a chemical reaction (polymer reaction) occurring between the polymer molecule and the organic low-molecular weight compound contained in each of the nanofibers, or by a chemical reaction (polymerization reaction) between the molecules of the organic low-molecular weight compound.

That is, it is assumed that a polymer network in which the nanofibers entangled with each other in a complex manner was present in a bulk portion, and hence the mechanical strength of the nanofiber sheet improved.

The air permeabilities of the sheets in Examples (Examples 1 to 4) were measured, and each of the nanofiber sheets was judged to have a satisfactory air permeability.

As described in each of Examples above, the nanofiber sheet of the present invention was found to have the following properties: peeling resistance between the nanofibers was satisfactory, and the nanofiber sheet had a high mechanical strength and a high specific surface area. In addition, by virtue of those properties, the nanofibers in the nanofiber sheet of the present invention do not easily loosen and hence the nanofiber sheet is advantageous for long-term use.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-081875, filed Apr. 13, 2015, which is hereby contained by reference herein in its entirety.

What is claimed is:

1. A nanofiber sheet comprising electro-spun nanofibers, each of which comprises a polymer having an imide structure,
   wherein the nanofiber sheet has pores and bulk portions at which the nanofibers are bonded to each other,
   wherein each of the bulk portions satisfies formula (1):

$$0.5\pi X^2 \leq Y \leq 5 \text{ μm}^2 \quad (1),$$

where X represents a diameter (μm) of each of the nanofibers and Y represents an area (μm$^2$) of an inscribed circle of a bulk portion when viewed from a surface, and
   wherein a number of the bulk portions per unit area of 1 μm$^2$ of the nanofiber sheet is $7 \times 10^{-3}$ or more.

2. The nanofiber sheet according to claim 1, comprising a pore having a diameter of 5 μm or less.

3. The nanofiber sheet according to claim 1, wherein each of the nanofibers has a diameter from 50 nm to 1.78 μm.

4. The nanofiber sheet according to claim 1, wherein an average presence ratio of the nanofibers on the surface of the nanofiber sheet is from 10% to 60%.

5. The nanofiber sheet according to claim 1, wherein the nanofibers are fused and bonded to each other at the bulk portions.

6. The nanofiber sheet according to claim 1, wherein the nanofibers are melted and bonded to each other at the bulk portions.

7. The nanofiber sheet according to claim 1, having a thickness from 1 μm to 1 mm.

8. The nanofiber sheet according to claim 1, wherein the nanofibers comprise a latent catalyst.

9. A dust-collecting filter for capturing a particle, the filter comprising a nanofiber sheet,
wherein the nanofiber sheet comprises electro-spun nanofibers, each of which comprises a polymer having an imide structure, and has bulk portions at which the nanofibers are bonded to each other,
wherein each of the bulk portions satisfies formula (1):

$$0.5\pi X^2 \leq Y \leq 5 \text{ μm}^2 \tag{1},$$

where X represents a diameter (μm) of each of the nanofibers and Y represents an area (μm$^2$) of an inscribed circle of a bulk portion when viewed from a surface, and
wherein a number of the bulk portions per unit area of 1 μm$^2$ of the nanofiber sheet is $7 \times 10^{-3}$ or more.

10. A container comprising:
a vent hole; and
a dust-collecting filter mounted to the vent hole,
wherein the dust-collecting filter comprises the dust-collecting filter of claim 9.

11. A method of producing a nanofiber sheet comprising electro-spun nanofibers, each of which comprises a polymer having an imide structure, and having bulk portions at which the nanofibers are bonded to each other,
wherein each of the bulk portions satisfies formula (1):

$$0.5\pi X^2 \leq Y \leq 5 \text{ μm}^2 \tag{1},$$

where X represents a diameter (μm) of each of the nanofibers and Y represents an area (μm$^2$) of an inscribed circle of a bulk portion when viewed from a surface, and
wherein a number of the bulk portions per unit area of 1 μm$^2$ of the nanofiber sheet being $7 \times 10^{-3}$ or more,
the method comprising:
electro-spinning plurality of nanofibers by:
extruding a solution containing the polymer from a spinning nozzle towards a collector; and
forming a nanofiber sheet precursor in which the nanofibers are entangled with each other,
wherein a voltage of 1 kV to 50 kV is applied to the spinning nozzle, and the collector is grounded; and
forming the bulk portions by heating the nanofiber sheet precursor.

12. The method according to claim 11, wherein the heating of the nanofiber sheet precursor is conducted under an unpressurized condition.

13. The method according to claim 11, wherein each of the nanofibers contains an organic resin material and an organic low-molecular weight compound having chemical reactivity, and
wherein the forming of the bulk portions comprises reacting the low-molecular compound in the nanofibers to bond at least two of the nanofibers to each other.

14. The method according to claim 13, wherein the organic low-molecular weight compound having chemical reactivity is at least one compound selected from the group consisting of oxazine, epoxy resin, and dimethacrylate.

15. The nanofiber sheet according to claim 1, wherein the electro-spun nanofibers are produced by extruding a solution containing the polymer from a spinning nozzle, to which a voltage of 1 kV to 50 kV is applied, toward a grounded collector.

* * * * *